(12) United States Patent
Culter et al.

(10) Patent No.: US 8,880,769 B2
(45) Date of Patent: Nov. 4, 2014

(54) MANAGEMENT OF TARGET DEVICES (75) Inventors: Bradley Culter, Magnolia, TX (US); James D Preston, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 290 days.

(21) Appl. No.: 13/286,334

(22) Filed: Nov. 1, 2011

(65) Prior Publication Data
US 2013/0111094 A1 May 2, 2013

(51) Int. Cl.
G06F 13/36 (2006.01)
G06F 13/00 (2006.01)

(52) U.S. Cl.
CPC ...................................... G06F 13/00 (2013.01)
USPC ............................ 710/311; 710/104; 710/306

(58) Field of Classification Search
USPC ......... 710/104–106, 305–307, 311, 313, 315, 710/8, 10, 30, 72, 74; 709/217–219, 709/227–229, 230, 236
See application file for complete search history.

(56) References Cited

U.S. PATENT DOCUMENTS

| | | | |
|---|---|---|---|
| 7,769,831 B2 | 8/2010 | Johnson | |
| 7,904,599 B1 | 3/2011 | Bennett | |
| 2008/0046538 A1 | 2/2008 | Susarla et al. | |
| 2008/0091933 A1* | 4/2008 | Marks et al. | 713/2 |
| 2008/0155562 A1* | 6/2008 | Stenfort et al. | 719/318 |
| 2008/0228897 A1* | 9/2008 | Ko | 709/213 |
| 2008/0244626 A1* | 10/2008 | Cagno et al. | 719/326 |
| 2009/0003361 A1* | 1/2009 | Bakthavathsalam | 370/401 |
| 2010/0049919 A1 | 2/2010 | Winokur et al. | |
| 2010/0312964 A1* | 12/2010 | DeKoning et al. | 711/114 |
| 2011/0264840 A1* | 10/2011 | Loffink | 710/315 |
| 2011/0314141 A1* | 12/2011 | Jibbe et al. | 709/224 |
| 2012/0278551 A1* | 11/2012 | Chakhaiyar et al. | 711/114 |

FOREIGN PATENT DOCUMENTS

WO WO-2010047713 4/2010

OTHER PUBLICATIONS

Reddy, Deepti. "Investigating Serial Attached SCSI (SAS) over TCP (eSAS) and benchmarking eSAS prototype against legacy SAS". UCCS Masters Project Proposal. Nov. 4, 2010.*
Scheier, Robert L. "SMI-S: What's in it for storage managers?". SearchStorage. Online Sep. 4, 2003. Retrieved from Internet Nov. 7, 2013. <http://searchstorage.techtarget.com/news/922603/SMI-S-Whats-in-it-for-storage-managers>.*
Goodman, Brad. "Introduction to Serial Attached SCSI (SAS) [and SATA too]". Online Jul. 8, 2009. Retrieved from Internet Nov. 7, 2013. <https://web.archive.org/web/20090708020927/http://www.bradgoodman.com/sasprimer>.*
"The Free On-Line Dictionary of Computing". Entry 'Graphical User Interface'. Mar. 25, 2002. Retrieved from Internet Feb. 25, 2014. <http://foldoc.org/gui>.*
"WordNet". Version 3.1. Princeton University. 2010. Retrieved from Internet Feb. 25, 2014. <http://wordnetweb.princeton.edu/perl/webwn?o2=&o0=1&o8=1&o1=1&o7=&o5=&o9=&o6=&o3=&o4=&s=network+topology>.*

(Continued)

Primary Examiner — Thomas J Cleary
(74) Attorney, Agent, or Firm — Preetam Pagar (57) ABSTRACT

Techniques for management of target devices are provided. User input for management of a target device may be received. The user input may be converted into a first format. The first format may be encapsulated into a second format and sent over a communications channel. The second format may be un-encapsulated to recover the first format. The first format may be provided to the target devices.

15 Claims, 4 Drawing Sheets

(56) References Cited

OTHER PUBLICATIONS

"Sun Fire X4100/X4100 M2 and X4200/X4200 M2 Servers Service Manual". Appendix F, 'Serial Attached SCSI BIOS Configuration Utility'. Sun Microsystems, Inc. 2009. Retrieved from Internet Feb. 25, 2014. <http://docs.oracle.com/cd/E19121-01/sf.x4200/819-1157-23/F_BIOS_RAID.html>.*

* cited by examiner

MANAGEMENT OF TARGET DEVICES

BACKGROUND

Direct attached storage (DAS) is a storage topology in which each initiator, such as a server computer, is directly attached to storage devices, such as disks. In DAS topology systems there is no intervening network between an initiator and the storage device. An initiator may contain a host bus adaptor connected to the storage devices. Access to the storage devices is through the host bus adaptor.

Storage area network (SAN) is a storage topology in which initiators are connected to a storage network. For example, the storage network may be a fiber channel network. Also connected to the network may be storage devices, such as disks. An initiator may contain a host bus adaptor, such as a fiber channel adaptor, to connect to the storage network. Access to the storage devices is achieved through the storage network.

DETAILED DESCRIPTION

Both DAS and SAN storage topologies are in wide use. However, both of these topologies may have certain shortcomings. For example, in DAS topologies, an initiator, which may also be referred to as a server, is directly attached to its associated storage devices. An application running on the server may read and write data to the associated storage devices. As such, the data is only available on the directly attached storage devices. If it becomes necessary to move the application to a different server, there may be a considerable amount of effort required to migrate the data from the storage devices associated with the old server to the storage devices associate with the new server.

The shortcomings of DAS described above may be alleviated through the use of SAN storage topologies. In a SAN storage topology the initiators are connected to the storage devices through the use of a storage network. The storage network may enable any initiator to communicate with any storage device. Thus, if an application running on a server reads and writes data to a storage device and that application is later moved to a different server, there is no need to migrate the data, as every server is able to access all storage devices through the storage network. However, there is a cost associated with this functionality. Typically a storage network, with associated routers and switches, must be purchased and provisioned, resulting in additional expense.

Direct attached network (DAN) is a shared high availability storage topology. In DAN topologies, each server is directly connected to a controller which is in turn connected to a device, such as an expander. Also connected to the expander may be a pool of storage devices. The expander operates similarly to an Ethernet switch, in that the expander may allow communications between any devices attached to the expander. The combination of servers and controllers may be referred to as a DAN cluster. Any server within the cluster is thus able to communicate with any controller or storage device in the cluster. This is achieved without requiring the complexity associated with a storage network, as is needed in SAN storage topologies.

Problems may arise when attempting to manage the storage devices in a DAN cluster when there is not at least one booted and operating server to present a control surface. Such problems do not arise in DAS systems, because the storage devices are only connected to a single server. Thus, management of storage devices in a DAS system may simply require sending in-band management commands to the storage devices from the single server. There would be no need to configure the storage devices for use by other servers as there are no other servers in a DAS system.

SAN systems may suffer from a similar problem as DAN systems, in that in-band storage device management commands may not be sent from a server if there are no operational servers connected to the SAN. However, SAN systems allow for additional points of connection to the storage devices through the storage network. A management station may be attached to the storage network and may appear as a server. The management station may be able to send storage device management commands to the storage devices through the storage network. In addition, out of band management of storage devices may be possible through the use of direct access to the controllers of the storage devices, such as through the use of proprietary interfaces or the Storage Management Initiative-Specification (SMI-S) standards based interface.

DAN systems typically do not include external interfaces to the controllers and storage devices as are present in SAN systems. Thus, it is not possible to directly connect an external management system to the controllers and storage devices for management purposes. The controllers in a DAN system typically contain ports to connect to storage devices or expanders, but do not contain ports, such as local area network (LAN) ports for connection to external systems.

Techniques described herein overcome the problems associated with in-band management of storage resources. A DAN cluster may typically be contained in an enclosure. The enclosure may include the servers, controllers, storage devices, and expander devices. The enclosure may also include power supplies, fans, and other peripheral equipment. In addition, the enclosure may include an enclosure manager that may be used to monitor the status of the enclosure. The enclosure manager may monitor items such as temperature, fan speed, power supply output, or a host of other operational parameters. In some example implementations, there may be multiple enclosures. The enclosures may be coupled together such that failure of components in one enclosure may be overcome through redundancy provided by a different enclosure. Furthermore components within each enclosure may be able to communicate with components in other enclosures through the storage fabric.

The enclosure manager may typically have a connection to systems outside of the DAN cluster. For example, the enclosure manager may contain a LAN port which allows the enclosure manager to communicate with external systems to report the conditions that are being monitored. The techniques described herein make use of this external interface to access the storage devices within the DAN cluster. The enclosure manager may implement the functionality of a management station. The enclosure manager may connect to the external world through the LAN port. The enclosure manager may also connect to the expander through a second LAN connection.

The enclosure manager may encapsulate in-band storage device commands into a format that may be used on the second LAN connection. For example, in the case of storage devices that use Serial attached Small Computer Systems Interface (SAS) commands, the commands may be encapsulated into an Ethernet frame. The encapsulated Ethernet frame may be sent to the expander, which in turn may un-encapsulate the SAS command. The SAS command may then be sent to the storage devices from the expander. Likewise, responses from the storage devices may be received at the expander. The expander may again encapsulate the SAS responses into Ethernet frames and send those frames to the enclosure manager over the second LAN connection. Thus, storage devices may be managed using in-band commands, without requiring that any of the servers within the DAN cluster be operational.

Figure 1:
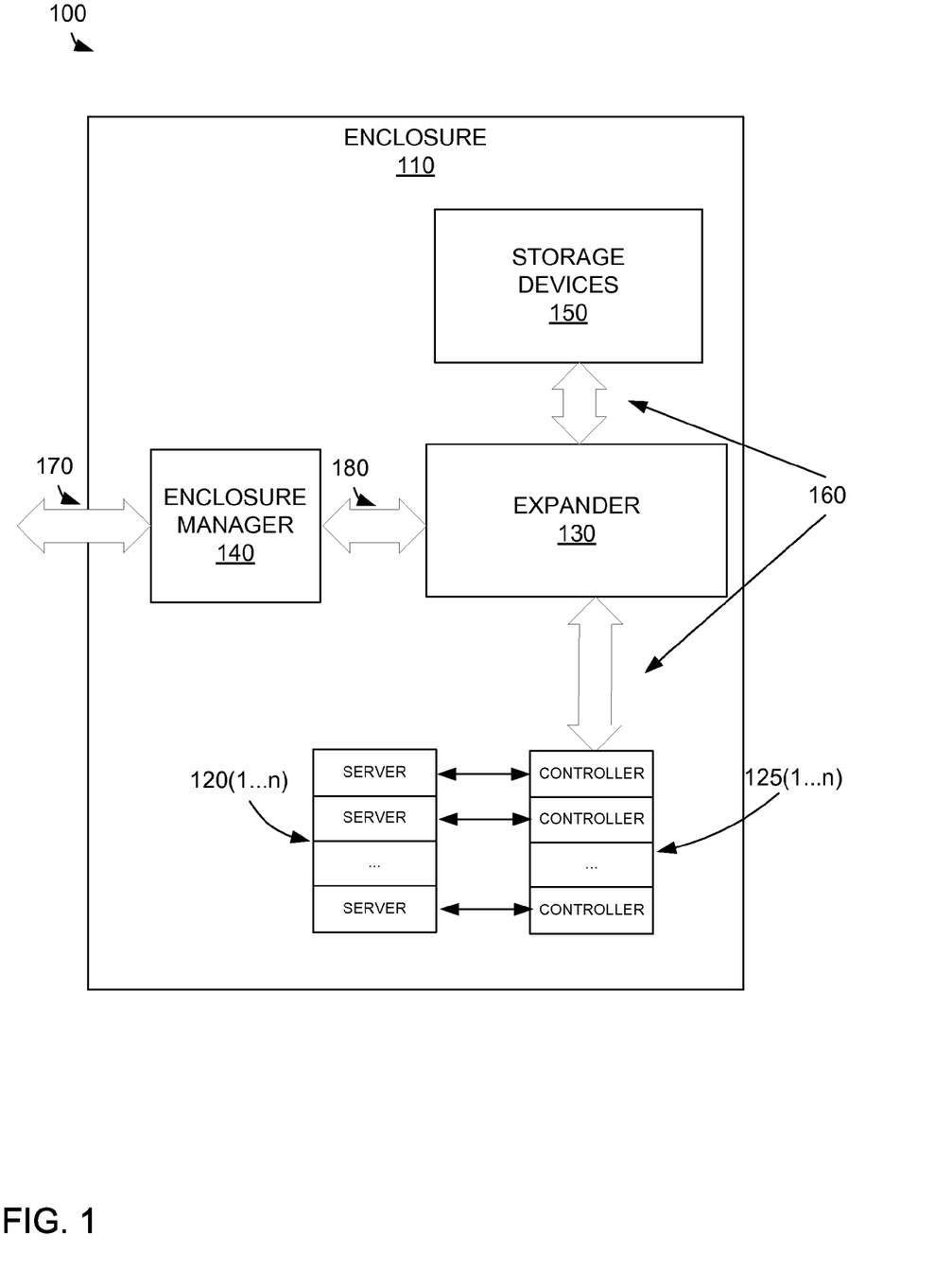
FIG. 1 is a high level example of an enclosure.

FIG. 1 is a high level example of an enclosure. The system 100 may include an enclosure 110. Within the enclosure may be one or more servers 120(1 . . . n), controllers 125(1 . . . n), an expander 130, an enclosure manager 140, and storage devices 150. The enclosure may house all of the components mentioned. For example, the enclosure may be a blade enclosure housing blade servers. The enclosure may also be a rack mount enclosure housing rack mount servers. Also included may be peripheral devices (not shown) to support the servers. For example, power supplies, fans, and other such support equipment may be housed within the enclosure.

The enclosure may include one or more servers 120(1 . . . n). The exact number of servers is relatively unimportant, and in fact, the techniques described herein relate to management of storage devices and controllers when no servers are booted and operational. As such, the presence of the servers at the time of management of the storage devices and controllers may not be required. Each server 120 may be directly connected to a controller 125(1 . . . n). The controller may be a simple storage controller, an array controller, a RAID controller, or any other type of controller that may allow a server to access a storage device. Included in the enclosure may be an expander 130. The expander may provide a switch fabric for connection to the controllers and the storage devices 150.

The storage devices themselves may be any type of storage device. For example, disk drives, tape drives, optical drives, or any other devices able to store data. Furthermore, the storage devices may be configured in any number of configurations. For example, storage devices may be configured as individual storage volumes, in arrays that are presented as an individual storage volume, or in redundant array of independent disk (RAID) arrays. A storage device may be configured as a boot volume, which may allow a server 120 to boot from the device. Storage devices may also be configured as non-boot storage volumes, used for storing data, but not for boot purposes.

The storage devices and the controllers may communicate with the expander and each other using a first protocol 160. For example, one such protocol is the SAS protocol. Other protocols may include AT Attachment (ATA), Serial ATA (SATA), Small Computer Systems Interface (SCSI), or any other suitable protocol. Commands sent from controllers to storage devices through the expander may be referred to as in-band commands. For example, a server may formulate an SAS command and send that command to the expander through the controller using the native format of the link between the controller and the expander. The expander may then forward the SAS command to the storage device, again using a format that is native to the link between the storage device and the expander.

Enclosure 110 may also include an enclosure manager 140. The enclosure manager may be a low power computer that is used to monitor operational parameters of the enclosure. For example, the enclosure manager may monitor the temperature within the enclosure, the operational status of the fans and power supplies, and any number of other parameters. The enclosure manager may contain an external interface 170 through which the enclosure manager may communicate with external systems. For example, the enclosure manager may contain an Ethernet LAN port that allows the enclosure manager to communicate with external systems.

The enclosure manager may also contain a second interface 180 that is coupled to the expander 130. The second interface may typically use a second protocol that is different than the protocol used by the expander to communicate with the storage devices and servers. For example, the second interface may be an Ethernet interface using the Ethernet protocol. Communications that occur between the enclosure manager and the expander over the second interface may be referred to as out of band communications.

In operation, the enclosure manager may receive user input for management of a storage device or controller. The enclosure manager may convert the user input into an in-band storage device command. For example, the user input may be converted into an SAS command to perform the management of the storage devices or controllers as specified by the user input. The enclosure manager may then encapsulate the in-band storage device command in an out of band format. For example, the SAS command may be encapsulated into an Ethernet frame format.

The enclosure manager may then send the encapsulated SAS command in the out of band format to the expander over an out of band interface. For example, the Ethernet frame encapsulating the SAS command may be sent to the expander over the out of band Ethernet interface. Upon receipt of the Ethernet frame, the expander may un-encapsulate the SAS command and insert the command onto the fabric containing the storage device or controller that is the target of the user's management command. The storage device or controller may then execute the user's management command.

Once the storage device or controller has executed the user's management command, the device or controller may send a response to the command. For example, once an SAS command is executed, a SAS response may be generated by the element that executed the command. The SAS response may indicate if the command completed successfully. The response may also include additional data that resulted from execution of the command. The element may generate a response and send the response to the expander.

At this point, the above described procedure may be executed again, albeit in the opposite direction. The SAS response may be received from the storage device or controller at the expander. The expander may then encapsulate the SAS response in an Ethernet frame. The Ethernet frame may then be sent back to the enclosure manager, which in turn un-encapsulates the Ethernet frame to recover the original SAS response. What should be understood is the entire operation described with respect to FIG. 1 did not require any of the servers 120(1 . . . n) to be booted and operational. As such, management of storage devices is achieved in the absence of operational servers, a capability that is not possible within a DAN cluster, absent the techniques described herein.

Figure 2:
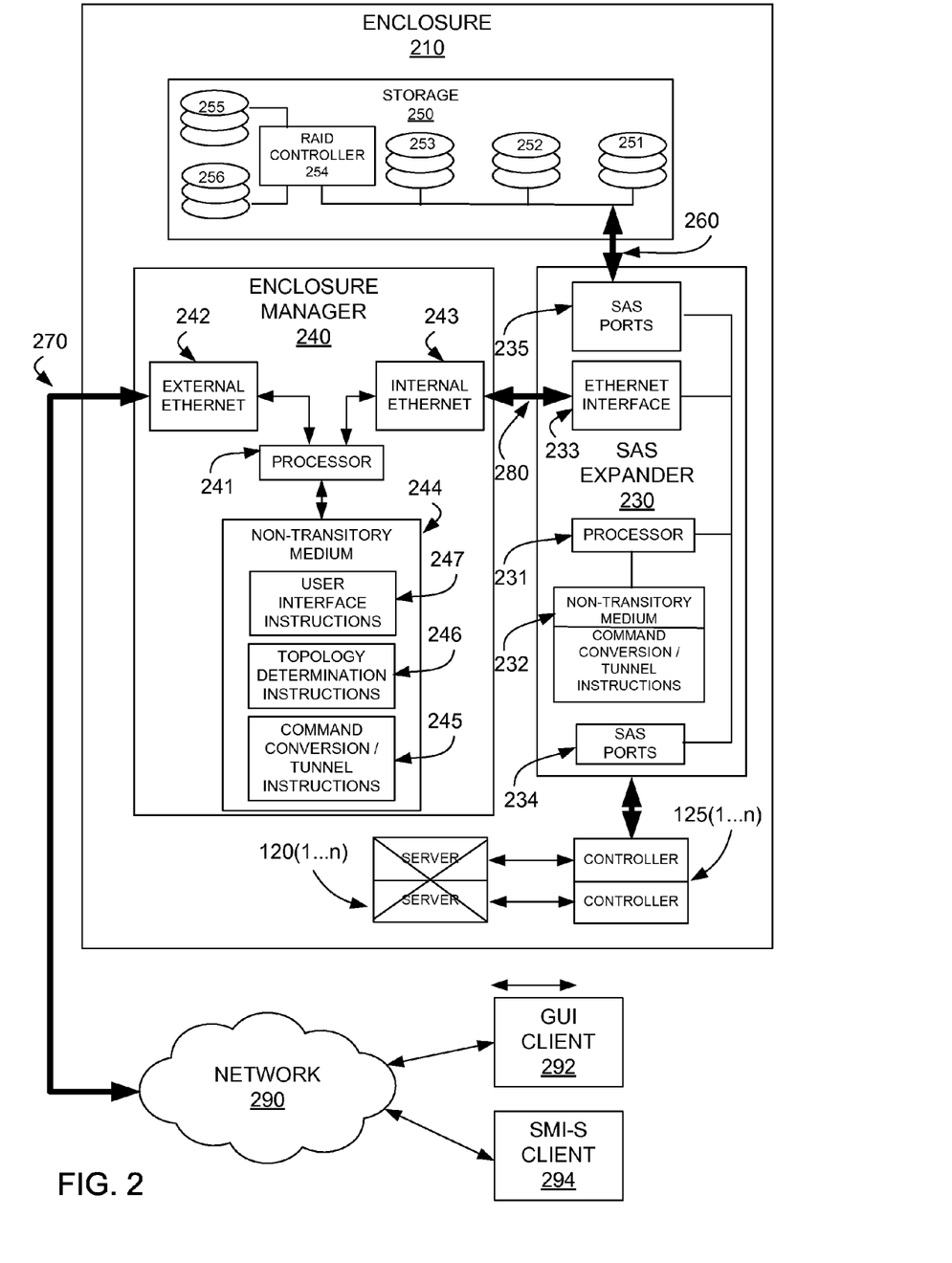
FIG. 2 is a more detailed high level example of an enclosure.

FIG. 2 is a more detailed high level example of an enclosure. The system 200 may include an enclosure 210. Within the enclosure may be servers 220(1 . . . n), controllers 225(1 . . . n), an SAS expander 230, an enclosure manager 240, and storage 250. As described above, techniques described herein permit management of storage devices and controllers when none of the servers 220 are operational. As such, the description of the servers is limited to simply note that the servers may access the storage devices through the SAS expander and appear as devices on the SAS fabric. However, the techniques described herein do not depend on the servers being operational or even present within the enclosure. The servers may each be coupled to a controller 225(1 . . . n). Several types of controllers were mentioned above. The controllers may be operational and ready to receive management commands even though the servers are not operational.

SAS expander 230 may provide a fabric through which devices connected to the SAS expander may communicate. Devices, such as the controllers and storage devices, may generate SAS command/response messages and send those messages to the SAS expander. The SAS expander may then route those messages to their intended destination. The SAS expander may include a processor 231 coupled to a non-transitory processor readable medium 232. The non-transitory processor readable medium may include thereon a set of instructions which if executed by the processor cause the processor to provide the functionality described herein. The medium 232 may contain instructions that allow the SAS expander to provide the functionality to enable communication between the devices attached to the expander. For example, coupled to the processor may be SAS ports 234, 235. Coupled to these ports may be controllers and storage devices, both of which may be referred to as targets. For purposes of clarity ports 234 are generally shown as connecting to controllers while ports 23 are shown as generally connecting to storage devices. It should be understood that there may be many physical ports within each of SAS ports 234, 235. Coupled to these ports may be controllers and storage devices, both of which may be referred to as targets.

The SAS expander may provide a fabric through which devices connected to the SAS ports may communicate. The instructions on the medium 232 may facilitate this communication. In addition, the medium may contain command conversion/tunnel instructions. Coupled to the processor may be an Ethernet interface 233. The Ethernet interface may be coupled to an enclosure manager 240, which is described below. SAS commands encapsulated in Ethernet frames may be received by the processor through the Ethernet interface. The instructions may cause the processor to convert the received Ethernet frames by un-encapsulating the SAS. The SAS commands may be inserted onto the SAS fabric by the processor. The processor may direct the SAS commands to one of the SAS ports for transmission to the intended target.

In other words, the SAS commands may be tunneled through an Ethernet interface between the enclosure manager and the SAS expander. Furthermore the process may also work in reverse. As SAS responses are received from targets, the SAS responses may be converted into Ethernet frames by encapsulating the responses. The Ethernet frames containing the encapsulated responses may then be returned to the enclosure manager.

The enclosure 210 may also include storage 250. Storage 250 may include any number of storage devices 251, 252, 253. The storage devices may be any type of storage device, including disk drives, solid state drives, tape drives, and optical drives. Storage 250 may also include other types of devices which may not directly store data, but appear to the servers as storage devices. For example, storage 250 may include array controllers, such as RAID controller 254. Coupled to the RAID controller may be storage devices 255, 256. To the servers, the RAID controller may appear as an individual storage device, despite the fact that the data may be distributed amongst multiple physical devices. The controllers described with reference to the storage devices may be separate from the controllers 225 connected to the servers. Regardless of the specific type of storage devices, devices 251, 252, 253, 254 may be coupled to the SAS ports 235 of the SAS expander. Thus, the storage devices are able to receive SAS commands and send SAS responses to the SAS fabric formed by the SAS expander.

The enclosure 210 may also include an enclosure manager. As mentioned above, the enclosure manager may be a computer that is generally used to monitor operational parameters of the enclosure. The enclosure manager may include a processor 241. Coupled to the processor may be an external Ethernet interface 242 which may be used to communicate with systems external to the enclosure. For example, the enclosure may communicate with an enclosure monitoring workstation (not shown) though an interface 270 to a network. The external Ethernet interface may also be used to communicate with a GUI client 292 or a SMIS-S client, which will be described below.

Also coupled to the processor may be a non-transitory processor readable medium 244. The non-transitory processor readable medium may include thereon a set of instructions which if executed by the processor cause the processor to provide the functionality described herein. The medium may include command conversion/tunnel instructions 245, topology determination instructions 246, and user interface instructions 247

The command conversion/tunnel instructions 245 may be similar to the instructions 232 described with respect to the SAS expander 230. The command conversion/tunnel instructions may instruct the processor to convert SAS commands by encapsulating the commands into an Ethernet frame. The instructions may further cause the processor to send the encapsulated commands over an internal Ethernet interface 243 to the Ethernet interface on the SAS expander. In other words the SAS commands may be tunneled through an Ethernet interface to the SAS expander. In addition, the instructions may cause the processor to receive SAS responses that are encapsulated in an Ethernet frame from the internal Ethernet interface 243, and convert those responses into SAS responses by un-encapsulating the responses from the Ethernet frame. Thus the tunneling process may be bi-directional.

The medium 246 may also include topology determination instructions 246. The topology determination instructions may cause the processor to determine the topology of the devices, such as targets, that are part of the SAS fabric formed by the SAS expander 230. As mentioned above, targets may include both storage devices as well as controllers. The SAS protocol provides for a discovery process by which an initiator may discover the topology of all devices connected to the fabric. For purposes of topology determination, the enclosure manager may behave as any other initiator and use the discovery process to generate the fabric topology.

The topology determination instructions may cause the processor to generate SAS discovery commands. Those commands may then be converted into Ethernet frames as described above. The Ethernet frames may then be sent to the SAS expander for further forwarding to the devices on the SAS fabric. Devices on the SAS fabric may respond to the discovery command with SAS responses that may be used to determine the topology of the SAS fabric. These responses may be encapsulated into Ethernet frames by the SAS expander and sent to the enclosure manager via the Ethernet interface 280. The responses may then be un-encapsulated into SAS responses. The topology determination instructions may use these SAS responses to generate the topology of devices connected to the SAS fabric.

The enclosure manager may also include user interface instructions 247. In one example implementation, the user interface instructions may cause the processor to generate a user interface based on the topology determined by the topology determination instructions. For example, the user interface instructions may cause the processor to implement a web server and generate web pages that present the topology of the devices connected to the SAS fabric. A GUI client 292, such as a web browser may connect to the enclosure manager through the external Ethernet interface 242. The client may connect though an external network 290, which may include public or private networks, including intranets and the Internet.

The web pages depicting the topology of the SAS fabric may be presented to a user. The web pages may also include controls that allow management of the devices connected to the SAS fabric. Examples of management functions are described below. The user may provide input for management of the devices connected to the SAS fabric. The user input may then be received by the processor. The user interface instructions may then cause the processor to receive the user input and convert the user input into the appropriate SAS commands to achieve the desired management function. The SAS commands may then be sent to the storage devices, as was described above. The SAS responses may also be received and presented to the user, again as described above.

In another example implementation, the user interface instructions 247 may cause the processor to represent the topology of the SAS fabric in a standard format, such as a format based on SMI-S. A SMI-S client device 294 may connect to the external Ethernet interface 242 of the enclosure manager through the network 290. The SMI-S client may run an application that allows a user to manage targets on a SAS fabric. The topology of the SAS fabric may be sent to the SMI-S client for display to a user.

The user may use the SMI-S client 294 to view the topology of the SAS fabric. Also included on the SMI-S client may be controls that allow the user to manage the devices connected to the SAS fabric. The SMI-S client may receive user input for management of the devices on the SAS fabric and convert that input into a SMI-S format. The SMI-S management commands may then be sent to the enclosure manager. The user interface instructions may cause the processor to receive the SMI-S commands and convert the commands to the appropriate SAS commands to achieve the desired management functions. The SAS commands may be sent and the SAS responses received from the devices connect to the SAS fabric as was described above.

The techniques described above allow for management of targets in a DAN cluster when there are no servers within the DAN cluster that are operational. In some cases, the techniques described above provide for management capabilities that are not available even if there were servers within the DAN cluster that are operational. Some examples of these management functions are described below, however it should be understood that the techniques described herein are in no way limited to the example management functions described.

Once example of a management function that may be performed using the techniques described herein is configuration of an array controller, such as a RAID array controller. As mentioned above, a RAID controller may appear on the SAS fabric as a target device, and as such may be presented to the user in the SAS topology. The user interface may allow the user to configure various parameters of the RAID controller, such as the RAID level (e.g. RAID 0, 1, etc). Furthermore, the individual storage devices that make up the RAID array may be configured.

Another example of a management function may be to configure a storage device as a boot device. By configuring a storage device as a boot device, a server within the DAN cluster may boot from such a device, and thus no longer require a dedicated boot device. Because any device may be configured as a boot device, there may no longer be need to maintain separate pools of storage devices for boot and data storage. The techniques described herein are useful because initial configuration of a storage device as a boot device may be burdensome, absent the techniques described herein.

For example, absent the techniques described herein, in order to configure a storage device as a boot device, at least one server must be booted and operational to provide a control surface for configuring the storage devices. However, in order to get that one server into an operational state, it must be booted. Thus, a circular problem arises in that a storage device cannot be configured as a boot device until at least one server is able to boot. Absent the techniques described herein, a server must first be booted using an external boot device. The techniques described herein allow for a storage device to be configured as a boot device while no server within the DAN cluster is operational. Configuring a server to boot from a storage device that has already been configured as a boot device is a lower level function that does not require the server to be booted and operational. Thus, the techniques described herein allow for easier management of servers booting from storage devices within the DAN cluster without requiring external boot resources.

Another example of a management function that may be performed using the techniques described herein is zoning and rezoning of storage devices. The SAS protocol allows for zoning such that certain storage devices may only be accessed by initiators that are in certain zones. For example, a server may only receive discovery responses from storage devices that are within the same zone as the server. Thus, because a server may only be aware of storage devices within the same zone, it may not be possible for a server to zone or rezone storage devices that are in a different zone, because the server may not even be aware of the existence of those devices.

The techniques described herein may overcome this problem by including the enclosure manager in a top level zone, such that the enclosure manager is able to determine the topology of the entire SAS fabric, not just the portions of the topology that are within any given zone. As such, the user is able to manage the zoning of all storage devices within the topology, because the enclosure manager is not limited to any given zone.

One more example of the management functions that may be achieved using the techniques described herein may not be directly related to configuration of storage resources, but rather to the handling of fault conditions. An SAS device, such as disk drive, may maintain a data buffer that contains operational data. Included in that operational data may be any faults that have occurred. The techniques described herein may be used by a user to retrieve the buffer from a storage device in the case where there has been a failure within the DAN cluster and no server is available to access the buffer on the storage device.

Furthermore, the retrieval of a buffer is not limited to storage devices alone. A server may typically connect to the SAS expander through a controller. The controller may contain a buffer similar to the one present on a storage device. In some cases, a server may fail, but the controller may still be receiving power and is operational. Because the controller appears as a target on the SAS fabric, the enclosure manager may send commands directly to the controller, even if the associated server is non-operational. An SAS command to dump the buffer may be sent directly to the controller and the response sent to the enclosure manager. As such, the buffer from the controller may be retrieved even when the server may no longer be operational.

As mentioned above, the above capabilities are simply examples of management tasks that may be performed utilizing the techniques described herein, and are not intended to be limiting. In general, any type of management action that may be performed within a DAN cluster with at least one operational server may also be performed while no servers are operational by utilizing the techniques described herein.

Figure 3:
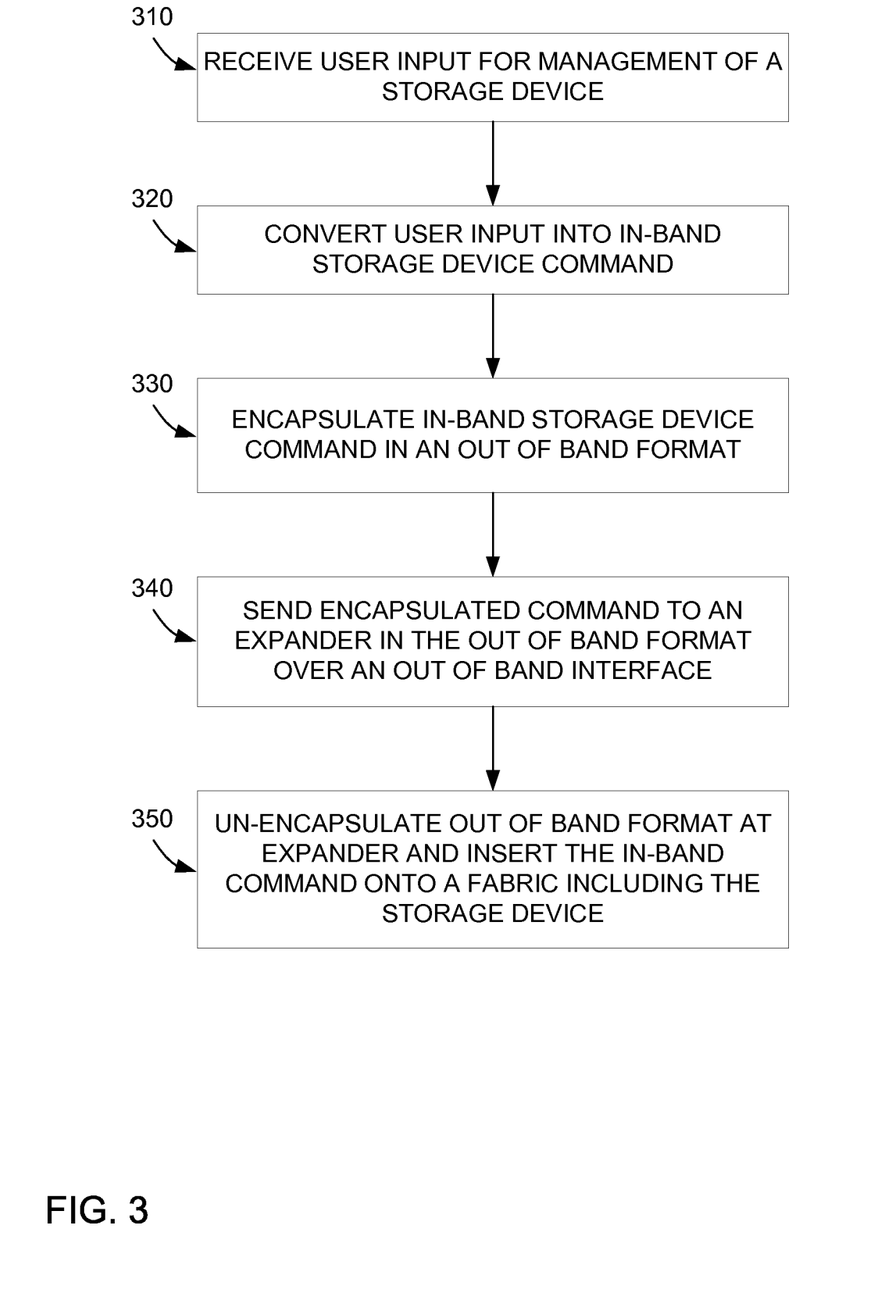
FIG. 3 is an example of a flow diagram for managing a storage device.

FIG. 3 is an example of a flow diagram for managing a target device. In block 310, user input for management of a target device may be received. For example, the user input may be received by a user interface provided by an enclosure manager. The input may be received from a user computer that is external to the DAN cluster. In block 320, the user input may be converted into an in-band target device command. For example, the management of the target device specified by the user input may be converted into the appropriate storage device command in the native format of the target device. In the case of SAS storage devices or controllers, the user input may be converted into the appropriate SAS command.

In block 330, the in-band storage devices command may be encapsulated in an out of band format. For example, in an Ethernet frame. Encapsulating the in-band command into an out of band format may allow the command to be sent using transport facilities that do not support the native format of the storage devices. Thus, encapsulating the SAS command into an Ethernet frame may allow the SAS command to be sent over an Ethernet link. In block 340, the encapsulated command may be sent to an expander in the out of band format over an out of band interface. As mentioned above, encapsulating the SAS command in an Ethernet frame may allow the command to be sent to an expander through an Ethernet interface, which typically does not support SAS commands natively.

In block 350, the out of band format may be un-encapsulated at the expander and the in-band command may be inserted onto a fabric including the target device. As described above, the SAS command may be encapsulated into an Ethernet frame and sent to the expander over an Ethernet interface. The encapsulated command may then be un-encapsulated at the expander, thus recovering the original SAS command. The SAS command may then be inserted onto the fabric in the SAS format, which is the native format of the target device.

Figure 4:
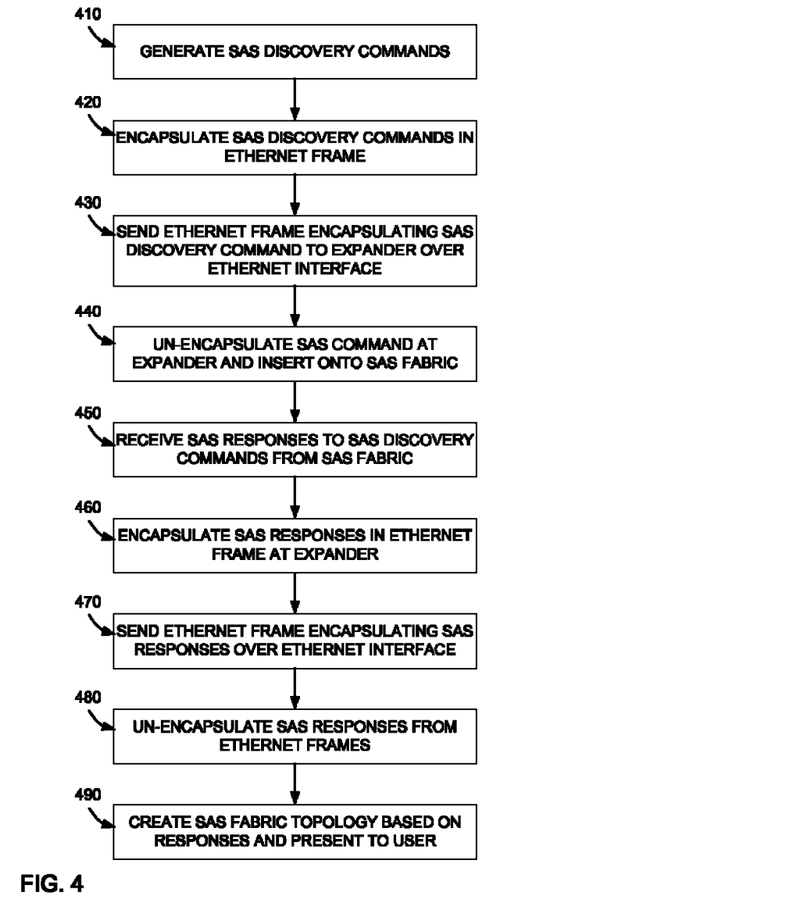
FIG. 4 is an example of a flow diagram for topology discovery.

FIG. 4 is an example of a flow diagram for topology discovery. In block 410 SAS discovery commands may be generated. SAS discovery commands may used by the SAS protocol to prompt any devices connected to the SAS fabric to make their presence known to other devices on the fabric. In block 420 the SAS discovery commands may be encapsulated into Ethernet frames. As described above, the use of the Ethernet frames allows SAS commands to be sent over an Ethernet interface. In block 430, the Ethernet frames encapsulating the SAS discovery commands may be sent to an expander over an Ethernet interface.

In block 440, the encapsulated SAS commands may be un-encapsulated at an expander and inserted onto the SAS fabric. In other words, the original SAS commands may be retrieved and then forwarded on to the devices on the SAS fabric. As mentioned above, the SAS discovery commands may prompt devices on the SAS fabric to make their presence known. The devices may send a response to the SAS discovery command including information that may be used to determine the topology of devices on the SAS fabric. In block 450, the SAS responses to the SAS discovery commands may be received from the fabric at the expander.

In block 460, the SAS responses may be encapsulated in Ethernet frames at the expander. Just as above, encapsulating the SAS responses in Ethernet frames may allow the responses to be sent over an Ethernet interface. In block 470, the Ethernet frames encapsulating the SAS responses may be sent over an Ethernet interface. In block 480, the Ethernet frames including the encapsulated SAS responses may be un-encapsulated to recover the original SAS responses. In block 490, an SAS fabric topology may be created based on the SAS responses. This topology may then be presented to the user in order for the user to manage the devices on the SAS fabric.

We claim:

1. A method comprising:
   receiving, at a first out of band interface, a user input comprising one of a plurality of management controls displayed to a user, wherein the one of the plurality of management controls is directed at a target device;
   converting the user input received at the first out of band interface into an in-band target device command;
   encapsulating the in-band target device command, that is converted from the user input, in an out of band format; and
   sending, over a second out of band interface, the encapsulated command in the out of band format to an expander, wherein the expander un-encapsulates the encapsulated command and inserts the in-band command onto a fabric including the target device.

2. The method of claim 1 wherein the in-band target device command is a serial attached small computer systems interface (SAS) command and the out of band format is an Ethernet frame.

3. The method of claim 2 further comprising:
   generating an SAS discovery command;
   encapsulating the SAS discovery command in an Ethernet frame; and
   sending the Ethernet frame encapsulating the SAS discovery command to the expander over an Ethernet interface, wherein the expander is within a direct attached network (DAN) cluster, and wherein the expander un-encapsulates the encapsulated SAS command and inserts the SAS command onto the fabric.

4. The method of claim 3 further comprising:
   receiving, from the expander, Ethernet frame encapsulated SAS responses to the SAS discovery command, wherein the expander receives the SAS responses from the fabric and encapsulates the SAS responses into Ethernet frames;
   un-encapsulating the Ethernet frame encapsulated SAS responses;
   creating a fabric topology based on the un-encapsulated SAS responses; and
   presenting the topology to the user.

5. The method of claim 1 wherein the management of the target device comprises configuring the target device as a boot device.

6. The method of claim 1 wherein the management of the target device comprises configuring the target device in a Redundant Array of Independent Disks (RAID) configuration.

7. The method of claim 1 wherein the management of the target device comprises rezoning the target device.

8. A non-transitory processor readable medium containing thereon a set of instructions, which if executed by a processor cause the processor to:
- determine a topology of a storage fabric comprising a plurality of initiators and targets;
- generate a user interface to present the topology to a user;
- receive user commands comprising a plurality of management controls, the plurality of management controls being displayed to the user, wherein the plurality of management controls are directed at a device, and wherein the device is one of an initiator or a target;
- convert the user commands into a native format of the storage fabric; and
- tunnel the commands in the native format of the storage fabric to the device through an expander.

9. The medium of claim 8 wherein the commands are commands to retrieve a log file of an initiator.

10. The medium of claim 8 wherein the plurality of management controls are displayed in web pages.

11. The medium of claim 8 wherein the user interface is a Storage Management Initiative Specification (SMI-S) interface, and wherein the storage fabric and expander are within a direct attached network (DAN) cluster.

12. The medium of claim 8 wherein determining the topology of the storage fabric further comprises instructions which if executed cause the processor to:
- tunnel discovery requests and responses in the native format of the storage fabric to and from the expander.

13. A system comprising:
- an enclosure manager including a first and second communications channel, to:
  - receive, over the first communications channel, user commands comprising a plurality of management controls, the plurality of management controls being displayed to a user, wherein the plurality of management controls are directed at a device; and
  - send the commands over the second communications channel, wherein the same type of interface is used to receive and send commands over the first and second communications channels, respectively;
- an SAS expander coupled to the second communications channel to receive the commands from the enclosure manager, the SAS expander further including an interface to a storage fabric, wherein the commands received over the second communications channel are inserted into the storage fabric; and
- a target device coupled to the storage fabric to receive the commands inserted by the SAS expander.

14. The system of claim 13 wherein the enclosure manager further generates a topology of the storage fabric and presents the topology to the user.

15. The system of claim 14 wherein the target device further sends responses to the commands to the SAS expander over the storage fabric, wherein the SAS expander sends the responses to the enclosure manager over the second communications channel.

* * * * *